July 2, 1957  H. E. PHILLIPS ET AL  2,797,870
TIME CYCLE INDICATOR

Filed Feb. 26, 1954  2 Sheets-Sheet 1

Hubert E. Phillips
Havilah E. Hinman
INVENTORS

July 2, 1957 H. E. PHILLIPS ET AL 2,797,870
TIME CYCLE INDICATOR
Filed Feb. 26, 1954 2 Sheets-Sheet 2
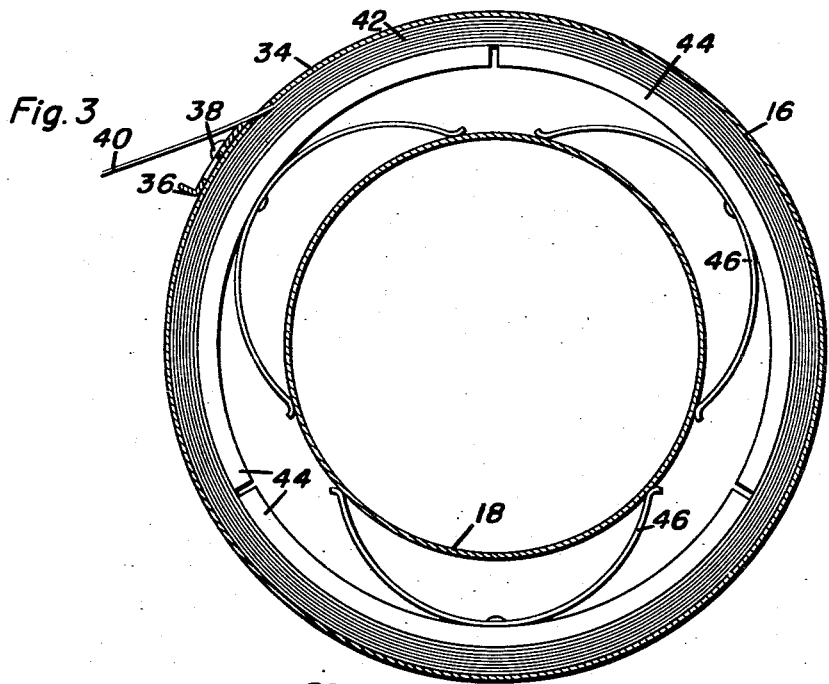
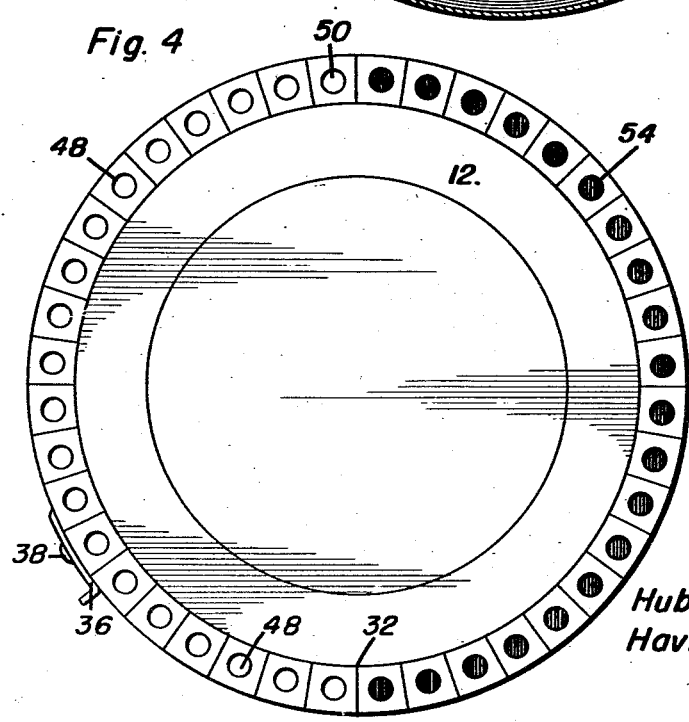
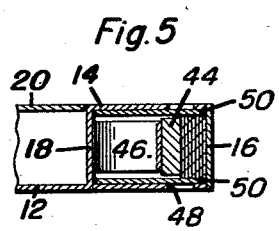
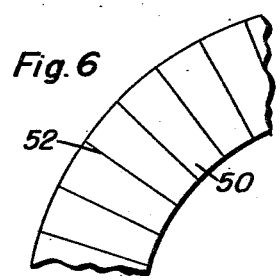
Hubert E. Phillips
Havilah E. Hinman
INVENTORS

United States Patent Office 2,797,870
Patented July 2, 1957

2,797,870

TIME CYCLE INDICATOR

Hubert E. Phillips, Asheville, and Havilah E. Hinman, Skyland, N. C.

Application February 26, 1954, Serial No. 412,902

5 Claims. (Cl. 235—71)

This invention relates to an indicator and more specifically provides a device that may be utilized by women for indicating their menstrual cycles.

An object of this invention is to provide an indicator which is simple in construction, efficient in operation, easy to utilize, versatile in utility, accurate in operation, well adapted for its purposes, and relatively inexpensive to manufacture.

Another object of this invention is to provide an indicator for designating the menstrual cycles of women and more specifically indicating the calendar date of the beginning or onset of each mentrual cycle and also may be utilized for indicating selective days within each cycle.

A further object of this invention is to provide an indicator having a shape similar to a cosmetic compact and having a storage space in the central portion thereof for storage of pills or other personal articles.

Still another important object of this invention is to provide an indicator which may be utilized for a full calendar year and which will quickly and easily indicate the beginning of each successive menstrual period.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a top plan section taken substantially along a center line of the indicator of the present invention;

Figure 4 is a bottom plan view of the construction of Figure 1;

Figure 5 is a detailed section showing the construction of the expanding segments for frictionally retaining the coiled tape in position; and Figure 6 is a top plan view showing a fragment of one of the marking surfaces underlying each end of the indicator.

Figure 1:
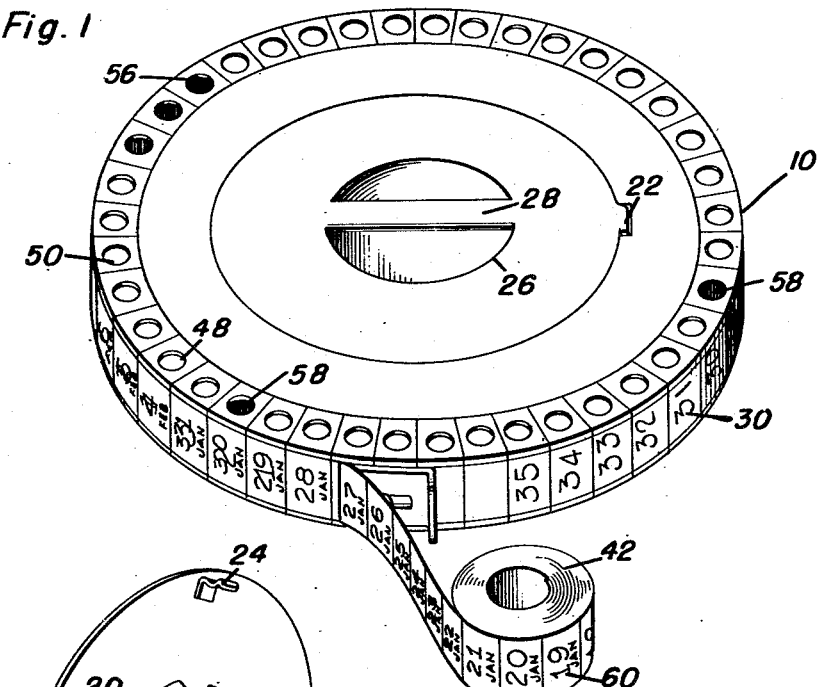
Figure 1 is a perspective view showing the top of the indicator of the present invention.
Figure 2:
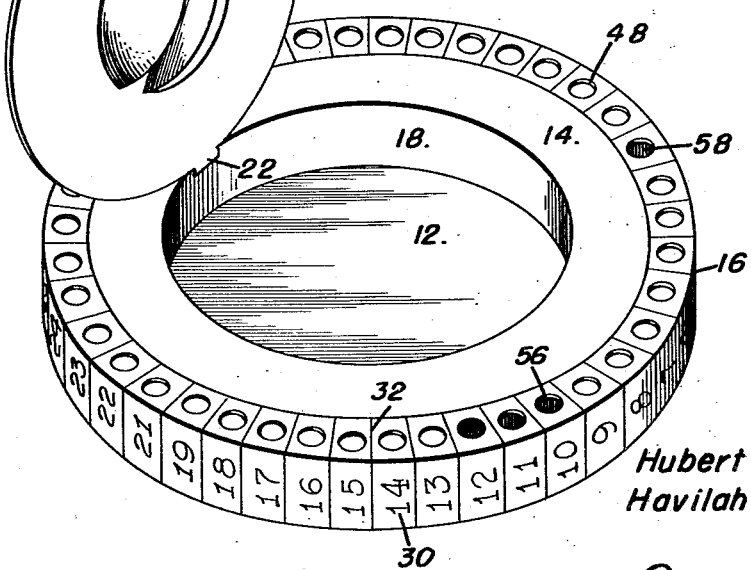
Figure 2 is a perspective view similar to Figure 1 and looking from the opposite side thereof, with the pivotal closure in open position, thereby showing the storage area within the indicator.

Referring now specifically to the drawings, it will be seen that the numeral 10 generally indicates the indicator of the present invention including a lower circular wall 12, an upper wall 14, an outer cylindrical wall 16 and an inner cylindrical wall 18 in spaced and concentric relation to the outer wall 16. The top wall 14 is provided with a pivoted closure 20 hingedly secured at one point by a hinge means 22 and resiliently secured in closed position with a spring clip 24 in opposition to the hinge means 22, thereby providing a compartment in the center of the indicator 10 for a purpose described hereinafter. On the outer or upper surface of the pivotal closure 20 are provided depressed areas 26 forming a cross-member 28 which acts as a handle for opening the pivotal closure 20 in an obvious manner. The outer cylindrical side wall 16 is transparent and provided with numerals 30 that are successively numbered from the numeral "1" to the numeral "35." It will be seen that the outer side wall 16 and the end walls 12 and 14 adjacent the side wall 16 are divided into sections, as defined by dividing lines 32. A slot 34 is provided in the side wall 16 and a sliding lock member 36 is slidable on a stud 38 into engagement with the free end 40 of a coiled flexible tape 42 positioned around the inner surface of the outer side wall 16. The inner surface of the coil tape 42 is engaged by a plurality of arcuate segments 44 forming a complete circle and a plurality of semi-circular spring members 46 are disposed between the segmental members 44 and the outer surface of the inner side wall 18, thereby urging the segmental members 44 towards the outer side wall 16 for frictionally retaining the tape 42 in position. The free end 40 of the tape 42 extends through the slot 34 and may be locked in position by moving the lock member 36 on the projecting stud 38 in an obvious manner.

It will be seen that the upper plate 14 is provided with an aperture 48 in each section of the plate 14 adjacent the outer side wall 16, and the lower wall 12 is also provided with apertures 48. A circular ring 50 divided into sections by lines 52 is positioned under each of the plurality of apertures 48 wherein the marking surface 50 may be colored as designated by the numerals 54, 56 and 58, with the various colored areas 54, 56 and 58 being colored differently for directing attention to the sections of the outer wall 16 for a purpose described hereinafter. The tape 42 is provided with suitable indicia, as indicated by the numeral 60, which designates the calendar days of the year, and each calendar day is on a section equal to the sections of the transparent outer wall 16.

The operation of the device will be readily understood. The container is similar in size and shape to the round, flat cosmetic compact commonly carried by women in their purses. The outer wall 16 is transparent and marked with thirty-five divisions of equal degrees of the circumference of the edge and numbered accordingly "1" to "35." Just inward, on each end of the devices 12 and 14 are thirty-five divisions, corresponding in position to the divisions on the outer wall 16. Each one of the divisions or sections on the end faces is perforated by a hole 48 which is large enough to admit the lead or crayon of a marking pencil. The calendar 42 may be for a period of two or more years, arranged on a tape so that each date is on a space the same size as each division on the edge of the indicator. The calendar tape is wound or coiled and placed in the indicator with the numerals visible through the transparent wall 16 of the indicator 10. It is held in place by the segmental members 42 and further pressed against the transparent wall 16 of the indicator by the spring 46, in an obvious manner. The free end 40 of the calendar tape 42 is passed through the slot 34 and may be locked in any position by engaging the locking member 36 with the free end of the tape 40. Underlying the divisions on each end of the indicator and under the apertures 48 is a marking surface 50 which may be either disposable or of permanent material that permits erasures wherein certain of the apertures 48 may be designated by certain colors or the like. The pivotal closure 20 forms a storage compartment in the center of the indicator 10 for storage of suitable personal articles.

In practical operation for use by women in determining the onset of the menstrual cycle and other dates concerning such cycle, the free end 40 of the tape 42 is pulled through the slot 34 until the calendar date corresponding to the date of the onset of the present or most recent menstrual period shows under division "1" on the outer wall 16 of the indicator 10. The date of expected onset of the next menstrual period will then show under the division corresponding in number to the number of days of the cycle. It will be understood that most women know the length in days of their respective cycles. For example, if a woman's menses start on March 25 and she knows she has a twenty-eight day cycle, she then sets March 25 under division "1" on the transparent wall 16 and looks under division "28" on the outer wall 16 and sees that she can expect her next period to start on April 21. She locks the tape 42 in place by manipulating the lock member 36 and can now refer to these facts at any time during the month. If she wishes to keep a permanent record of her menstrual cycles, she can easily mark one period's onset on the calendar as she unwinds it to set the next one, and thus save it after it has been detached from the indicator. The particular markings as indicated by the numeral 58 will be made on the marking surface 50, thereby assuring the correct relation between the onset of successive menstrual cycles.

The device is also useful in cyclic therapy wherein a doctor has prescribed the administration of certain medicines on certain days of each menstrual cycle. Cycle therapy in gynecology is finding more frequent use in treatment of many problems peculiar to the female reproductive system. The woman can mark these days as indicated by the numeral 54 on the bottom end 12 of the indicator 10, thereby reminding herself of the necessity for taking the medicine. Further, it will be seen that the compartment formed by the pivotal closure 20 may be utilized for carrying the medicine or pills that she will take during the prescribed days. Further, recognizable symbols or colors may be placed on the upper end 14, as indicated by the numeral 56 for indicating the most fertile days from information furnished by her physician, thereby assisting the woman in conception. It will be understood that the principles of the present indicator may be utilized for other uses wherein a cyclic operation is present.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An indicator comprising an integral cylindrical container having a relatively shallow depth and a peripheral wall, said peripheral wall of the container having a transverse slot therein, an elongated flexible tape coiled about the inner surface of the peripheral wall, and means engaging the inner surface of the tape for frictionally resisting movement thereof, said tape having indicia thereon and a free end extending through the slot, said peripheral wall of the container being transparent for viewing the indicia on the tape, said engaging and resisting means including an inner wall spaced from the peripheral wall in concentric relation thereto, a plurality of segmental members positioned between the concentric walls, and spring means positioned between the inner wall and the segmental members thereby urging the segmental members towards the inner surface of the tape thereby forming means engaging the inner surface of the tape for frictionally retaining the tape in adjusted position.

2. The structure as defined in claim 1 and wherein a sliding lock is provided on the side wall for engaging the tape extending through the slot thereby securing said tape in adjusted position.

3. An indicator comprising an integral cylindrical container having a relatively shallow depth and a peripheral wall, said peripheral wall of the container having a transverse slot therein, an elongated flexible tape coiled about the inner surface of the peripheral wall, and means engaging the inner surface of the tape for frictionally resisting movement thereof, said tape having indicia thereon and a free end extending through the slot, said peripheral wall of the container being transparent for viewing the indicia on the tape, said engaging and resisting means including an inner wall spaced from the peripheral wall in concentric relation thereto, a plurality of segmental members positioned between the concentric walls, and spring means positioned between the inner wall and the segmental members thereby urging the segmental members towards the inner surface of the tape thereby forming means engaging the inner surface of the tape for frictionally retaining the tape in adjusted position, said peripheral wall being divided into a plurality of equal sections, indicia provided on said sections, and significant indicia means positioned on the upper and lower walls of the container for directing attention to certain of said sections.

4. An indicator comprising an integral cylindrical container having a relatively shallow depth and a peripheral wall, said peripheral wall of the container having a transverse slot therein, an elongated flexible tape coiled about the inner surface of the peripheral wall, and means engaging the inner surface of the tape for frictionally resisting movement thereof, said tape having indicia thereon and a free end extending through the slot, said peripheral wall of the container being transparent for viewing the indicia on the tape, said engaging and resisting means including an inner wall spaced from the peripheral wall in concentric relation thereto, a plurality of segmental members positioned between the concentric walls, and spring means positioned between the inner wall and the segmental members thereby urging the segmental members towards the inner surface of the tape thereby forming means engaging the inner surface of the tape for frictionally retaining the tape in adjusted position, said tape indicia representing the calendar days of a year, and said transparent peripheral wall being provided with indicating means for designating the menstrual cycles of women.

5. An indicator comprising an integral cylindrical container having a relatively shallow depth and a peripheral wall, said peripheral wall of the container having a transverse slot therein, an elongated flexible tape coiled about the inner surface of the peripheral wall, and means engaging the inner surface of the tape for frictionally resisting movement thereof, said tape having indicia thereon and a free end extending through the slot, said peripheral wall of the container being transparent for viewing the indicia on the tape, said engaging and resisting means including an inner wall spaced from the peripheral wall in concentric relation thereto, a plurality of segmental members positioned between the concentric walls, and spring means positioned between the inner wall and the segmental members thereby urging the segmental members towards the inner surface of the tape thereby forming means engaging the inner surface of the tape for frictionally retaining the tape in adjusted position, and a marking surface on the upper and lower walls of the container for receiving significant markings to designate certain indicia on the tape.

References Cited in the file of this patent

UNITED STATES PATENTS

| | | |
|---|---|---|
| 207,675 | Peck | Sept. 3, 1878 |
| 498,104 | Buck | May 23, 1893 |
| 1,855,399 | Klotz | Apr. 26, 1932 |
| 2,577,544 | Schenk et al. | Dec. 4, 1951 |